W. F. ILGENFRITZ.
PLANTING MACHINE.
APPLICATION FILED JULY 2, 1908.
933,178.
Patented Sept. 7, 1909.
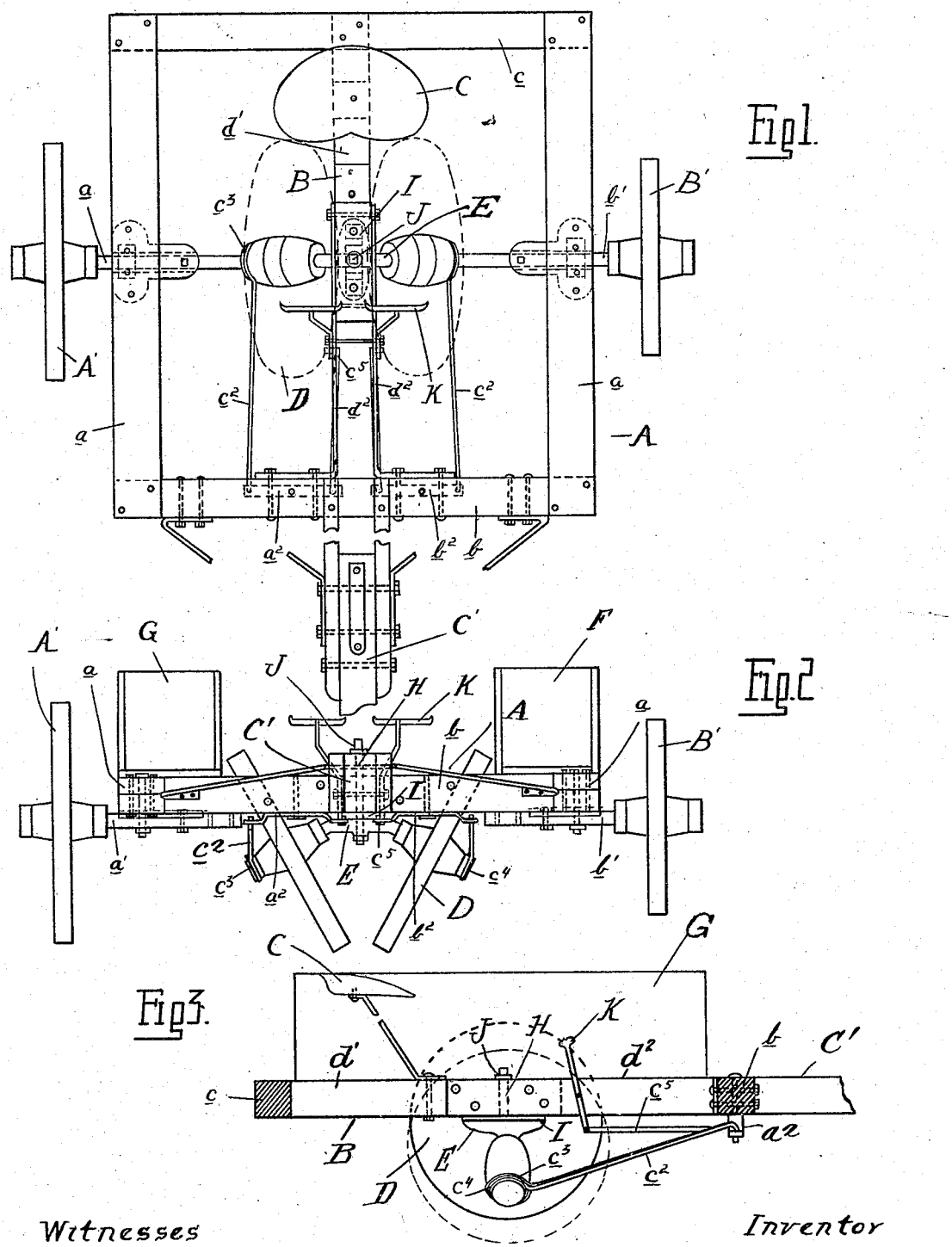
Witnesses
Inventor
Wilbur F. Ilgenfritz.
By
att'ys

UNITED STATES PATENT OFFICE.

WILBUR F. ILGENFRITZ, OF MONROE, MICHIGAN.

PLANTING-MACHINE.

933,178. Specification of Letters Patent. Patented Sept. 7, 1909.

Application filed July 2, 1908. Serial No. 441,653.

*To all whom it may concern:*

Be it known that I, WILBUR F. ILGENFRITZ, a citizen of the United States of America, residing at Monroe, in the county of Monroe and State of Michigan, have invented certain new and useful Improvements in Planting-Machines, of which the following is a specification, reference being had therein to the accompanying drawings.

The invention relates generally to planting machines, and particularly to an implement of this character especially designed for planting graft and stock, and consists in the construction of the machine, in the peculiar arrangement and combination of its parts, and in various details of construction as more fully hereinafter described.

In the drawings,—Figure 1 is a plan view of a machine embodying my invention; Fig. 2 is a front end view thereof; and Fig. 3 is a sectional side elevation, with some of the parts of the machine broken away.

In construction, the machine comprises a wheeled frame A,—preferably of rectangular configuration,—formed of side members $a$ and front and rear rails $b$ $c$ respectively. Extending centrally and longitudinally of the frame described is a seat supporting member B, upon which is mounted at the rear of the frame the driver's seat C of usual construction. C' designates the usual draft bar at the forward end of the frame.

Journaled preferably to the seat support in advance of the seat is a pair of wheels D adapted to gather the soil from opposite sides of the furrow and cover the roots of the graft or stock, and press the same firmly about the roots. The wheels are carried by a substantially yoke-shaped axle E, the spindle portions extending downwardly as indicated in Fig. 2, causing the wheels to converge below the frame sufficiently to press upon opposite sides of the graft or stock to be planted.

In order that the plants may be firmly set in the ground, I preferably weight the frame by placing ballasts, such as loose stones and the like, in longitudinal receptacles F and G provided for this purpose and arranged upon opposite sides of the frame as indicated. I also construct the wheeled frame in such manner that in addition to the weight of the ballast practically the entire weight of the frame will be supported by the presser wheels. I accomplish this by providing a supporting wheel A' at one side of the frame and centrally thereof on a stub shaft $a'$, and a similar supporting wheel B' upon the opposite side of the frame and on a corresponding stub shaft $b'$ which is of less diameter than the first-mentioned wheel, this latter wheel being normally out of contact with the ground and serving primarily as a safety wheel for preventing the overturning of the implement.

In practice, a furrow is first formed in the ground and the graft or stock placed therein at distances apart. The machine is then drawn over the furrow in such manner that the pressing wheels will gather the dirt from its opposite sides, cover the roots of the stock, and firmly set the same in the ground.

In most instances the furrow the planting machine follows is irregular, and I have therefore provided means for shifting the presser wheels in a horizontal plane to compensate for any irregularities, and in this manner set the graft and stock without injury to the plants.

The axle E described is provided with a vertical standard H which projects upwardly through a suitable casting I upon the seat support and is provided with a nut or other retaining device J upon its upper end to hold the parts in place and permit of horizontal rotation of the presser wheels.

For shifting the wheels to follow the furrow I provide foot levers K pivoted upon opposite sides of the seat support in operative relation to the seat, and connections between the levers and the presser wheels whereby upon the movement of either lever by the operator the wheels will be shifted in a horizontal plane in the required direction.

Preferably the connections are rigid, comprising horizontal leevrs $a^2$ $b^2$ pivoted upon the under side of the front rail $b$, connecting rods $c^2$ between the outer ends of the levers and the wheel hubs, the rods being preferably provided with eyes $c^3$ that engage grooves $c^4$ formed for that purpose in the wheel hub, and similar rods $c^5$ connecting the opposite ends of the levers $a^2$ $b^2$ with the lower ends of the foot levers.

In order that the driver may have an unobstructed view of the furrow to permit of proper shifting of the presser wheels, I provide the seat supporting member B with a forked forward end portion B². The seat support preferably comprises a rigid bar $d'$ extending to the rear of the frame to a point preferably beyond the center thereof, and spaced angle bars $d^2$ connecting the bar $d'$ with the front rail $b$ of the frame.

What I claim as my invention is,—

1. In a planting machine, the combination with a supporting frame, of a draft member at the forward end and a seat at the rear of the frame, and a pair of presser wheels converging below the frame and journaled in advance of the seat, and means for adjusting said wheels in a horizontal plane.

2. In a planting machine, the combination of a main frame, and spaced complementary supports therefor comprising respectively a ground wheel and a pair of transversely alining presser wheels, the latter being arranged in proximity one to the other and converging below the frame.

3. In a planting machine, the combination with a supporting frame, of a seat thereon, a pair of presser wheels pivoted to the frame for horizontal rotation, foot levers upon the frame in operative relation to the seat, and connections between said levers and the wheels.

4. In a planting machine, the combination with a supporting frame, of a pair of presser wheels converging below the frame and rotatable in a horizontal plane, vertical foot levers, horizontal levers pivoted to the forward portion of the frame, and connections between the vertical and horizontal levers and between the latter levers and the presser wheels.

5. In a planting machine, the combination with a main frame, of a seat support thereon having a forked forward end portion, a pair of presser wheels pivoted centrally to the frame for horizontal rotation, and foot levers upon the seat support controlling the horizontal movement of the wheels.

6. In a planting machine, the combination with a main frame, of a supporting wheel at one side thereof, and a similar wheel at the opposite side of less diameter than the first-mentioned wheel, and a pair of presser wheels upon the frame projecting below the supporting wheels and converging below the frame.

7. In a planting machine, the combination of a main frame, and complementary supports therefor comprising a ground wheel at one side of the frame journaled substantially midway of its ends, and a pair of presser wheels journaled centrally in the frame in transverse alinement with the ground wheel, the presser wheels being arranged one in proximity to the other and converging below the frame.

8. In a planting machine, the combination with a main frame, and means for supporting the entire frame comprising a ground wheel, and a pair of transversely-alining presser wheels spaced from the ground wheel.

In testimony whereof I affix my signature in presence of two witnesses.

WILBUR F. ILGENFRITZ.

Witnesses:
C. WILLIAM BEEK,
JOHN F. HAUESERER.